United States Patent
Shirakawa et al.

(10) Patent No.: US 10,967,366 B2
(45) Date of Patent: Apr. 6, 2021

(54) METHOD FOR PRODUCING EXHAUST GAS PURIFYING CATALYST AND EXHAUST GAS PURIFYING CATALYST

(71) Applicant: TOYOTA JIDOSHA KABUSHIKI KAISHA, Toyota (JP)

(72) Inventors: Shogo Shirakawa, Toyota (JP); Masahide Miura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 27 days.

(21) Appl. No.: 16/223,699

(22) Filed: Dec. 18, 2018

(65) Prior Publication Data

US 2019/0193065 A1 Jun. 27, 2019

(30) Foreign Application Priority Data

Dec. 26, 2017 (JP) .............................. JP2017-248846

(51) Int. Cl.
| | |
|---|---|
| *B01J 37/00* | (2006.01) |
| *B01J 23/44* | (2006.01) |
| *B01J 23/46* | (2006.01) |
| *B01J 37/04* | (2006.01) |
| *B01J 35/00* | (2006.01) |
| *B01D 53/94* | (2006.01) |

(52) U.S. Cl.
CPC .......... *B01J 37/0072* (2013.01); *B01D 53/94* (2013.01); *B01J 23/44* (2013.01); *B01J 23/464* (2013.01); *B01J 35/002* (2013.01); *B01J 35/0066* (2013.01); *B01J 37/04* (2013.01)

(58) Field of Classification Search
CPC ...... B01J 23/44; B01J 23/464; B01J 37/0072; B01J 37/04; B01J 2523/822; B01J 2523/824; B01D 53/94; B01D 53/944; B01D 53/9422; B01D 2255/1023; B01D 2255/1025

See application file for complete search history.

(56) References Cited

U.S. PATENT DOCUMENTS

| | | | |
|---|---|---|---|
| 2006/0094595 A1* | 5/2006 | Labarge | B01J 37/346 502/325 |
| 2014/0038814 A1* | 2/2014 | David | B01J 37/16 502/330 |

(Continued)

FOREIGN PATENT DOCUMENTS

| | | |
|---|---|---|
| JP | 2013-103143 A | 5/2013 |
| JP | 5821973 B2 | 11/2015 |
| JP | 2016-198759 A | 12/2016 |

*Primary Examiner* — Jun Li
(74) *Attorney, Agent, or Firm* — Sughrue Mion, PLLC

(57) ABSTRACT

The present disclosure provides a method for producing an exhaust gas purifying catalyst, in which fine Rh—Pd particles exhibiting high catalytic activity are produced such that a variation in the Pd composition can be reduced. The present disclosure relates to a method for producing an exhaust gas purifying catalyst having fine composite metal particles containing Rh and Pd, comprising: preparing a starting material solution containing Rh and Pd, in which the atomic percentage of Pd to the total of Rh and Pd is 1 atomic % to 15 atomic %; and allowing the prepared starting material solution to react with a neutralizer by a super agitation reactor having a rotation number of 500 rpm or more, to generate fine composite metal particles.

15 Claims, 8 Drawing Sheets

(56) References Cited

U.S. PATENT DOCUMENTS

| | | |
|---|---|---|
| 2015/0005160 A1 | 1/2015 | Nitta et al. |
| 2016/0296912 A1 | 10/2016 | Shirakawa et al. |
| 2018/0021757 A1* | 1/2018 | Karpov .................. B01J 37/16 |
| | | 423/213.5 |

* cited by examiner

METHOD FOR PRODUCING EXHAUST GAS PURIFYING CATALYST AND EXHAUST GAS PURIFYING CATALYST

CROSS REFERENCE TO RELATED APPLICATIONS

The present application claims priority from Japanese patent application JP2017-248846 filed on Dec. 26, 2017, the content of which is hereby incorporated by reference into this application.

BACKGROUND

Technical Field

The present disclosure relates to a method for producing an exhaust gas purifying catalyst and an exhaust gas purifying catalyst.

Background Art

Exhaust gas discharged from the internal combustion engine of automobiles, for example, from the internal combustion engine such as gasoline engine or diesel engine, comprises harmful components such as carbon monoxide (CO), hydrocarbon (HC), and nitrogen oxide (NOx).

Hence, in general, an exhaust gas purifying device for decomposing and removing such harmful components is established in the internal combustion engine, and almost all of these harmful components are detoxified by an exhaust gas purifying catalyst equipped in this exhaust gas purifying device. As such exhaust gas purifying catalysts, for example, a three way catalyst and a NOx storage reduction catalyst have been known.

The three way catalyst is a catalyst that simultaneously carries out oxidation of CO and HC and reduction of NOx in a stoichiometric (theoretical air-fuel ratio) atmosphere.

On the other hand, the NOx storage reduction catalyst is a catalyst that oxidizes NO contained in exhaust gas to $NO_2$ and stores the $NO_2$ in a lean atmosphere, and reduces the $NO_2$ to nitrogen ($N_2$) in a stoichiometric atmosphere and a rich atmosphere. Thus, the NOx storage reduction catalyst smartly utilizes changes in exhaust gas components in a lean atmosphere, a stoichiometric atmosphere, and a rich atmosphere.

However, even in the case of adopting these catalysts, purification of exhaust gas still has problems, and various studies have been conducted.

For example, JP 2016-198759 A discloses an exhaust gas purifying catalyst having fine composite metal particles containing Rh and Pd (which are also referred to as "fine Rh—Pd particles" in the present description, etc.), wherein the average percentage of Pd to the total of Rh and Pd is 1.7 atomic % to 24.8 atomic % when the fine particles in the exhaust gas purifying catalyst are analyzed according to STEM-EDX.

SUMMARY

It has been known that Rh serving as an active point exhibits catalytic activity such as NOx reduction, when Rh is converted to the state of a metal in an exhaust gas purifying catalyst. As such, at a low temperature or under an oxidizing atmosphere, Rh remains as the state of an oxide and is not reduced to the state of a metal, and thus, it is difficult for Rh to exhibit its catalytic activity. Hence, in JP 2016-198759 A, Pd having a lower oxygen affinity than Rh has been focused, and catalytic activity is improved by making Pd and Ph into a composite.

In order to confirm the optimal amount of Pd to the total of Rh and Pd in fine Rh—Pd particles, the present inventors have conducted a tracing experiment according to the method described in JP 2016-198759 A (see Comparative Examples 1 to 4 in the present description). FIG. 6 shows a relationship between the atomic percentage of Pd to the total of Rh and Pd (wherein the "atomic percentage of Pd to the total of Rh and Pd" is also referred to as "Pd composition" in the present description, etc.) in a starting material solution and NOx 50% purifying temperature, in exhaust gas purifying catalysts obtained by the tracing experiment.

As is found from FIG. 6, in the fine Rh—Pd particles in the exhaust gas purifying catalyst obtained by the tracing experiment, the exhaust gas purifying catalyst exhibits the largest catalytic activity when the Pd composition in the starting material solution is around 15 atomic %. In other words, the catalytic activity of the fine Rh—Pd particles may not be sufficient when the amount of Pd is too small, and the catalytic activity of the fine Rh—Pd particles may become lower than that of fine particles of Rh alone when the amount of Pd is too large. Accordingly, it is considered that the catalytic activity of the fine Rh—Pd particles is increased by allowing the fine Rh—Pd particles to comprise a suitable amount of Pd.

Moreover, in the fine Rh—Pd particles obtained in the tracing experiment, in which the Pd composition in the starting material solution is 5 atomic % (see Comparative Example 2 in the present description), a variation in the Pd composition in the fine Rh—Pd particles (wherein the "variation in the Pd composition in the fine Rh—Pd particles" is also referred to as "a variation in the Pd composition" in the present description, etc.) was measured. As a result, it was found that the variation in the Pd composition is large in the obtained fine Rh—Pd particles. FIG. 7 shows a relationship between each measurement point of the fine Rh—Pd particles and the Pd composition in the fine Rh—Pd particles, in the exhaust gas purifying catalyst obtained by the tracing experiment.

In the fine Rh—Pd particles obtained by the tracing experiment, it is considered that the variation in the Pd composition is large because Rh and Pd are not uniformly dispersed in the fine Rh—Pd particles. Further, it is also considered that the variation in the Pd composition is large because the degree of composite of Rh and Pd is not sufficient and thus, an excessive amount of Pd needs to be added in order to carry out sufficient composite of Rh and Pd in the fine Rh—Pd particles, in the method of JP 2016-198759 A. Since Rh and Pd are not uniformly dispersed in the fine Rh—Pd particles, and further, an excessive amount of Pd is present in the fine Rh—Pd particles, it is considered that the fine Rh—Pd particles include fine particles of Rh alone, Rh-rich fine Rh—Pd particles, and Pd-rich fine Rh—Pd particles, all of which have low activity, as well as fine Rh—Pd particles comprising a suitable amount of highly active Pd. FIG. 8 shows a schematic view of the fine Rh—Pd particles in the exhaust gas purifying catalyst obtained by the tracing experiment.

As described above, in JP 2016-198759 A, each fine Rh—Pd particle in an exhaust gas purifying catalyst has varied from the desired Pd composition, and as a result, it has been likely that an exhaust gas purifying catalyst exhibiting desired NOx purification performance cannot be efficiently obtained.

Accordingly, the present disclosure provides a method for producing an exhaust gas purifying catalyst, in which fine Rh—Pd particles exhibiting high catalytic activity are produced such that a variation in the Pd composition can be reduced.

In order to reduce a variation in the Pd composition, it is considered that shearing stress caused by super agitation is added upon production of fine Rh—Pd particles.

For example, JP 2013-103143 A discloses that, in a method for producing a composite catalyst comprising $Co_3O_4$ and $CeO_2$ for use in purifying CO in exhaust gas, shearing stress caused by super agitation is added into a mixed solution of starting materials and a neutralizer, so as to generate a state in which active species, $Co_3O_4$ and $CeO_2$ are mixed with each other at a nano level.

WO 2013/108424 A1 discloses that the formation of a uniform composite oxide can be promoted by adding shearing stress caused by super agitation into a mixed solution of cobalt salt, copper salt and a neutralizer.

Hence, as a result of intensive studies, the present inventors have found that, in a method for producing an exhaust gas purifying catalyst having fine composite metal particles containing Rh and Pd, a variation in the Pd composition can be reduced by (i) preparing a starting material solution such that the percentage of Pd to the total of Rh and Pd can be kept within a predetermined range, and (ii) stirring the starting material solution prepared in (i) and a neutralizer by a super agitation reactor that rotates at a specific rotation number, and as a result, the composite rate of Rh and Pd in the fine composite metal particles is improved, and a catalyst having high activity can be obtained although the additive amount of Pd is small, thereby completing the present disclosure.

Specifically, the gist of the present disclosure is as follows.

(1) A method for producing an exhaust gas purifying catalyst having fine composite metal particles containing Rh and Pd, comprising:
preparing a starting material solution containing Rh and Pd, in which an atomic percentage of Pd to a total of Rh and Pd (=(number of Pd atoms/(total number of Rh and Pd atoms))×100) is 1 atomic % to 15 atomic %; and
allowing the prepared starting material solution to react with a neutralizer by a super agitation reactor having a rotation number of 500 rpm or more, to generate fine composite metal particles.
(2) The method according to the above (1), wherein the atomic percentage of Pd to the total of Rh and Pd is 2 atomic % to 5 atomic %.
(3) The method according to the above (1), wherein the rotation number of the super agitation reactor is 1000 rpm or more.
(4) The method according to the above (2), wherein the rotation number of the super agitation reactor is 1000 rpm or more.
(5) The method according to the above (1), wherein the neutralizer is an organic base.
(6) The method according to the above (2), wherein the neutralizer is an organic base.
(7) The method according to the above (3), wherein the neutralizer is an organic base.
(8) The method according to the above (1), wherein the starting material solution is a mixed solution of an Rh nitrate solution and a Pd nitrate solution, and the neutralizer is tetramethylammonium hydroxide.
(9) The method according to the above (2), wherein the starting material solution is a mixed solution of an Rh nitrate solution and a Pd nitrate solution, and the neutralizer is tetramethylammonium hydroxide.
(10) The method according to the above (3), wherein the starting material solution is a mixed solution of an Rh nitrate solution and a Pd nitrate solution, and the neutralizer is tetramethylammonium hydroxide.
(11) The method according to the above (4), wherein the starting material solution is a mixed solution of an Rh nitrate solution and a Pd nitrate solution, and the neutralizer is tetramethylammonium hydroxide.
(12) An exhaust gas purifying catalyst having fine composite metal particles containing Rh and Pd, wherein
when the fine composite metal particles containing Rh and Pd in the exhaust gas purifying catalyst are analyzed according to STEM-EDX, an average of an atomic percentage of Pd to a total of Rh and Pd is 2 atomic % to 5 atomic % (wherein the average of the atomic percentage of Pd to the total of Rh and Pd is a value calculated by randomly selecting 10 or more fine composite metal particles containing Rh and Pd from the exhaust gas purifying catalyst, measuring all of the selected fine composite metal particles containing Rh and Pd according to STEM-EDX, totalizing all values of the atomic percentage of Pd to the total of Rh and Pd in each fine composite metal particle containing Rh and Pd, and dividing the obtained sum by a total number of all of the selected fine composite metal particles containing Rh and Pd), and
a standard deviation regarding a variation in the atomic percentage of Pd to the total of Rh and Pd is less than 5 (wherein the standard deviation regarding the variation in the atomic percentage of Pd to the total of Rh and Pd is calculated by randomly selecting 20 or more fine composite metal particles containing Rh and Pd from the exhaust gas purifying catalyst, measuring all of the selected fine composite metal particles containing Rh and Pd according to STEM-EDX, calculating the atomic percentage of Pd to the total of Rh and Pd in each fine composite metal particle containing Rh and Pd, defining the number of all of the selected fine composite metal particles containing Rh and Pd as a total number, and calculating based on the atomic percentage of Pd to the total of Rh and Pd in each fine composite metal particle containing Rh and Pd).

According to the present disclosure, fine Rh—Pd particles in an exhaust gas purifying catalyst can be produced, such that a variation in the Pd composition can be reduced.

DETAILED DESCRIPTION

Figure 1:
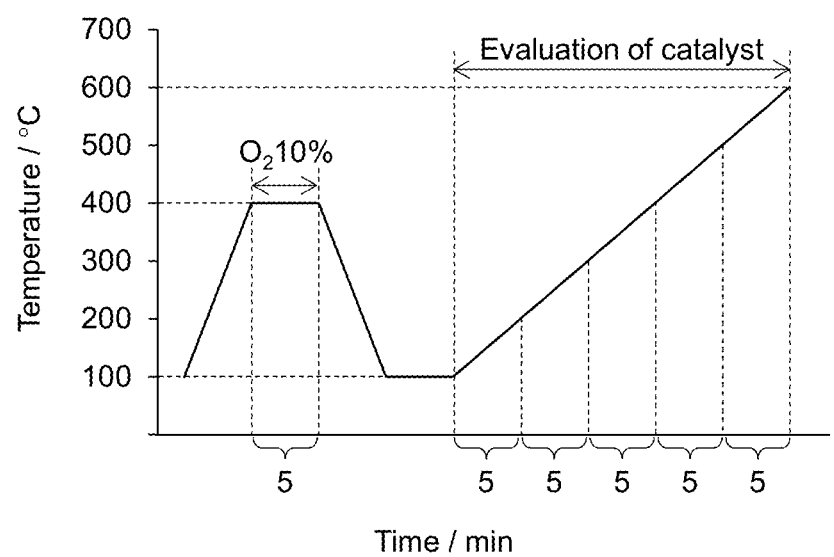
FIG. 1 shows a relationship between time and temperature in activity evaluation.

Hereinafter, some embodiments of the present disclosure are described in detail.

In the present description, the characteristics of the present disclosure are described with reference to figures, as appropriate. In the figures, the size and shape of each unit are exaggerated to clarify the present disclosure, and thus, the actual size and shape are not precisely depicted. Therefore, the technical scope of the present disclosure is not limited to the sizes and shapes of individual units shown in these figures. It is to be noted that the method for producing an exhaust gas purifying catalyst and the exhaust gas purifying catalyst of the present disclosure are not limited to the below-mentioned embodiments. Modifications, improvements, and the like, which can be carried out by a person skilled in the art, can be performed on the present disclosure within a range that is not deviated from the gist of the present disclosure, and the present disclosure can be carried out in various forms.

The present disclosure relates to a method for producing an exhaust gas purifying catalyst having fine composite metal particles containing Rh and Pd, comprising: preparing a starting material solution containing Rh and Pd, in which the atomic percentage of Pd to the total of Rh and Pd is within a predetermined range; and allowing the prepared starting material solution to react with a neutralizer by a super agitation reactor that rotates at a specific rotation number, to generate fine composite metal particles.

Hereafter, preparation of a starting material solution is defined as a step (i), and a reaction performed by a super agitation reactor is defined as a step (ii). Both steps are described below.

(i) A Step of Preparing a Starting Material Solution Containing Rh and Pd, in which the Atomic Percentage of Pd to the Total of Rh and Pd is within a Predetermined Range In the step (i) of the present disclosure, a starting material solution containing Rh and Pd, in which the atomic percentage of Pd to the total of Rh and Pd (=(number of Pd atoms/(total number of Rh and Pd atoms))×100) is 1 atomic % to 15 atomic % is prepared. In some embodiments, a starting material solution containing Rh and Pd, in which the atomic percentage of Pd to the total of Rh and Pd is 2 atomic % to 5 atomic %, is prepared.

Even if the Pd composition is within the above-described range, which is smaller than the conventional art, the composite rate of Rh and Pd in fine composite metal particles is improved according to the present disclosure. Accordingly, the fine composite metal particles can achieve high activity, namely, improved NOx purification performance.

The starting material solution comprises a raw material of Rh and a raw material of Pd.

The raw material of Rh contained in the starting material solution is a raw material that can be dissolved as ions in the starting material solution, such as salts of Rh, Rh halides, and a combination thereof, but the type of such a raw material is not limited. Examples of the raw material of Rh include: inorganic salts of Rh, such as Rh nitrate, Rh phosphate, and Rh sulfate; organic salts of Rh, such as Rh oxalate and Rh acetate; halides of Rh, such as Rh fluoride, Rh chloride, Rh bromide and Rh iodide; and a combination thereof. In some embodiments, the raw material of Rh contained in the starting material solution is an Rh nitrate solution.

Regarding the raw material of Pd contained in the starting material solution, the above description of raw materials of Rh ions can be referred to. In some embodiments, the raw material of Pd contained in the starting material solution is a Pd nitrate solution.

The concentrations of Rh ions and Pd ions in the starting material solution are not limited, as long as the Pd composition is within the above-described range. With regard to the concentration of Rh ions, in some embodiments, the total Rh ion concentration is 0.01 mol/L (M) to 1 M based on the starting material solution. In some embodiments, the total Rh ion concentration is 0.03 M to 0.5 M based on the starting material solution. With regard to the concentration of Pd ions, in some embodiments, the total Pd ion concentration is 0.1 mM to 50 mM based on the starting material solution. In some embodiments, the total Pd ion concentration is 0.5 mM to 25 mM based on the starting material solution.

The starting material solution may comprise a further solvent. The type of such a further solvent is not limited. Examples of the further solvent include solvents used for the raw material of Rh and the raw material of Pd, for example, water and organic solvents such as alcohol. In some embodiments, the further solvent comprised in the starting material solution is water.

Also, the starting material solution may comprise a protective agent. The protective agent is able to prevent excessive aggregation of fine composite metal particles and to moderately disperse the fine composite metal particles in a solution. Accordingly, the protective agent is able to moderately disperse a plurality of composite metal particles having a roughly uniform nanosize in an exhaust gas catalyst.

The type of the protective agent is not limited, and examples of the protective agent include polyvinyl pyrrolidone (PVP), polyvinyl pyrrolidone K25 (PVP-K25), polyethyleneimine, polyallylamine, poly(N-carboxymethyl)allylamine, poly(N,N-dicarboxymethyl)allylamine, allylamine, poly(N-carboxymethyl)ethyleneimine, and a combination thereof. In some embodiments, PVP having high solubility is used as the protective agent.

The concentration of the protective agent is not limited, as long as the protective agent is able to prevent aggregation of fine metal particles. In some embodiments, the concentration of the protective agent can be adjusted such that the number of atoms of the protective agent is 1 to 1000 times higher than the total number of Rh and Pd atoms. In some embodiments, the concentration of the protective agent can be adjusted such that the number of atoms of the protective agent is 1 to 500 times higher than the total number of Rh and Pd atoms. In some embodiments, the concentration of the protective agent can be adjusted such that the number of atoms of the protective agent is 1 to 100 times higher than the total number of Rh and Pd atoms. Herein, when the protective agent is a polymer such as PVP, the number of atoms of the protective agent means the number of atoms of the monomeric units thereof.

In the step (i) of the present disclosure, the order of mixing the raw material of Rh, the raw material of Pd, optionally a further solvent, and optionally a protective agent, the mixing temperature, the mixing method, the mixing time, and the like are not limited, as long as the raw materials and the like are mixed, so that the raw materials and the like can be homogeneously mixed with one another.

(ii) A Step of Allowing the Starting Material Solution to React with a Neutralizer by a Super Agitation Reactor, to Generate Fine Composite Metal Particles In the step (ii) of the present disclosure, the starting material solution prepared in the step (i) is allowed to react with a neutralizer by a super agitation reactor having a rotation number of 500 rpm or more, to generate fine composite metal particles.

Herein, the neutralizer can be used to hydrate Rh ions and Pd ions in the starting material solution, so as to generate fine composite metal particles. In addition, the neutralizer may optionally have the function of a solvent.

The type of the neutralizer is not limited. Examples of the neutralizer include: organic bases including quaternary ammonium hydroxide, such as tetraalkylammonium hydroxide, for example, tetramethylammonium hydroxide and tetraethylammonium hydroxide; inorganic bases, such as ammonia and the hydroxides of alkaline metal and alkaline earth metal; and a combination thereof. In some embodiments, the neutralizer is an organic base. In some embodiments, the neutralizer is tetramethylammonium hydroxide or tetraethylammonium hydroxide. By using an organic base as such a neutralizer, the organic base can play a role as a protective agent.

The amount of the neutralizer is not limited. In some embodiments, the amount of the neutralizer can be adjusted such that the number of atoms of neutralizer is 1 to 100000 times higher than the total number of Rh and Pd atoms. In some embodiments, the amount of the neutralizer can be adjusted such that the number of atoms of neutralizer is 1 to 50000 times higher than the total number of Rh and Pd atoms. In some embodiments, the amount of the neutralizer can be adjusted such that the number of atoms of neutralizer is 1 to 10000 times higher than the total number of Rh and Pd atoms.

In addition, the neutralizer may comprise a further solvent. The type of such a further solvent is not limited. Examples of the further solvent include solvents used for the starting material solution, for example, water and organic solvents such as alcohol. In some embodiments, the further solvent is water.

When the neutralizer comprises a further solvent, the concentration of the neutralizer is not limited. In some embodiments, the concentration of the neutralizer is 0.05 M to 5 M based on the solution comprising the neutralizer. In some embodiments, the concentration of the neutralizer is 0.5 M to 2.5 M based on the solution comprising the neutralizer.

In the present disclosure, the super agitation reactor (SA (Super Agitation) reactor) is a reactor equipped with a stirring device capable of adding large shearing stress to a solution as a target using a stirrer that stirs by high-speed rotation. In the present disclosure, the rotation number of the super agitation reactor is 500 rpm or more. In some embodiments, the rotation number of the super agitation reactor is 1000 rpm or more. The upper limit value of the rotation number of the super agitation reactor is not limited because of the feature of the present disclosure, in which shearing stress obtained by rotation with a certain rotation number or more is given to the starting material solution and the neutralizer. In some embodiments, the rotation number of the super agitation reactor is 1000 rpm to 40000 rpm. In some embodiments, the rotation number of the super agitation reactor is 5000 rpm to 10000 rpm. In some embodiments, the rotation number of the super agitation reactor is 7000 rpm to 9000 rpm.

An example of the super agitation reactor may be "ULREA (registered trademark)" manufactured by M Technique Co., Ltd. When the "ULREA (registered trademark)" manufactured by M Technique Co., Ltd. is used herein as a super agitation reactor, it has been confirmed that the effects are exhibited even if the rotation number is 1000 rpm.

The reaction of the starting material solution with the neutralizer by a super agitation reactor is carried out by supplying the starting material solution and the neutralizer, separately, into the super agitation reactor. In some embodiments, the reaction of the starting material solution with the neutralizer by a super agitation reactor is carried out by supplying the starting material solution and the neutralizer, separately, into the super agitation reactor around a stirrer thereof that stirs by high-speed rotation. Thereby, the starting material solution is mixed with the neutralizer for the first time in the super agitation reactor, in which the stirrer stirs by high-speed rotation, so that the reaction is initiated. In some embodiments, upon supplying the fluids, a solvent, for example, the same solvent as that used for the starting material solution is present in the super agitation reactor.

The reaction of the starting material solution with the neutralizer by the super agitation reactor can be carried out either in a batch system or in a continuous system. In some embodiments, the reaction of the starting material solution with the neutralizer by the super agitation reactor is carried out in a continuous system.

The rate of supplying the starting material solution and the neutralizer is not limited. In some embodiments, the rate of supplying the starting material solution and the neutralizer is 10 ml/min to 100 ml/min. In some embodiments, the rate of supplying the starting material solution and the neutralizer is 30 ml/min to 60 ml/min. The rate of supplying the starting material solution and the rate of supplying the neutralizer may be identical to or different from each other.

The reaction temperature in the present disclosure is not limited. In some embodiments, the reaction temperature in the present disclosure is 30° C. to 100° C. In some embodiments, the reaction temperature in the present disclosure is 50° C. to 80° C.

By allowing the starting material solution to react with the neutralizer in a super agitation reactor that rotates in the above-described rotation number, the starting material solution and the neutralizer can react with each other at a nano level, and as a result, a variation in the Pd composition in the obtained fine composite metal particles can be reduced. Consequently, the composite rate of Rh and Pd is improved in the fine composite metal particles, and the obtained fine composite metal particles can achieve high activity, namely, improved NOx purification performance, even if the additive amount of Pd is small.

The fine composite metal particles obtained by the present disclosure are then subjected to maturation, filtration, washing and drying, as necessary.

The fine composite metal particles obtained by the present disclosure contain Rh and Pd. When the fine composite metal particles containing Rh and Pd in an exhaust gas purifying catalyst are analyzed according to STEM-EDX, the average of the Pd composition is 1 atomic % to 15 atomic %. In some embodiments, when the fine composite metal particles containing Rh and Pd in an exhaust gas purifying catalyst are analyzed according to STEM-EDX, the average of the Pd composition is 2 atomic % to 5 atomic %. Besides, the Pd composition in the starting material solution used upon production of the fine composite metal particles and the Pd composition in the fine composite metal particles are generally almost the same values.

Herein, the average of the Pd composition, which is obtained when the fine composite metal particles containing Rh and Pd in the exhaust gas purifying catalyst are analyzed according to STEM-EDX, is a value calculated by randomly selecting 10 or more, 100 or more, or 1000 or more fine composite metal particles containing Rh and Pd from the exhaust gas purifying catalyst, measuring all of the selected fine composite metal particles containing Rh and Pd according to STEM-EDX, totalizing all values of the atomic percentage of Pd to the total of Rh and Pd in each fine composite metal particle containing Rh and Pd, and dividing the obtained sum by the total number of all of the selected fine composite metal particles containing Rh and Pd.

Moreover, with regard to the fine composite metal particles obtained by the present disclosure, a variation in the Pd composition is small, and standard deviation regarding the variation in the Pd composition is less than 5. In some embodiments, the standard deviation regarding the variation in the Pd composition is less than 4.

Herein, the standard deviation regarding the variation in the Pd composition is calculated by randomly selecting 20 or more, 100 or more, or 1000 or more fine composite metal particles containing Rh and Pd from the exhaust gas purifying catalyst, measuring all of the selected fine composite metal particles containing Rh and Pd according to STEM-EDX, calculating the atomic percentage of Pd to the total of Rh and Pd in each fine composite metal particle containing Rh and Pd, defining the number of all of the selected fine composite metal particles containing Rh and Pd as a total number, and calculating based on the atomic percentage of Pd to the total of Rh and Pd in each fine composite metal particle containing Rh and Pd.

Besides, when fine particles other than the fine composite metal particles containing Rh and Pd are comprised in the exhaust gas purifying catalyst, the fine particles other than the fine composite metal particles containing Rh and Pd can be distinguished from the fine composite metal particles containing Rh and Pd by analyzing the fine particles in the exhaust gas purifying catalyst according to STEM-EDX.

In the fine composite metal particles obtained by the present disclosure, since Pd suppresses oxidation of Rh, the metallic state of Rh can be maintained over a long period of time. Thereby, the catalytic activity of Rh can be maintained or improved, and also Rh can be used in an appropriate amount, even under conditions, for example, conventional gas composition, pressure, temperature, etc., in which conventionally Rh is easily oxidized.

Moreover, Pd itself has high exhaust gas-purifying ability, and as a result, the fine composite metal particles containing Rh and Pd can exhibit synergistic exhaust gas-purifying effect because of these two types of metal elements.

Furthermore, since Rh and Pd are homogeneously dispersed in the fine composite metal particles obtained by the present disclosure, a variation in the Pd composition is small. As a result, the composite rate of Rh and Pd can be improved in the fine composite metal particles, and the obtained fine composite metal particles can achieve high activity, namely, improved NOx purification performance, even if the additive amount of Pd is small.

The mean particle diameter of the fine composite metal particles obtained by the present disclosure is not limited. In some embodiments, the mean particle diameter of the fine composite metal particles obtained by the present disclosure is 1 nm to 10 nm. In some embodiments, the mean particle diameter of the fine composite metal particles obtained by the present disclosure is 2 nm to 5 nm.

Herein, in the present disclosure, the "mean particle diameter" means an arithmetic mean value of the measurement values obtained by randomly selecting 10 or more particles and then measuring the equivalent circle diameters (Heywood diameters) of the selected particles, using a means such as a scanning transmission electron microscope (STEM), unless otherwise specified.

By setting the mean particle diameter of the fine composite metal particles within the above-described range, the exhaust gas purifying catalyst can sufficiently exhibit NOx-purifying ability.

The fine composite metal particles obtained by the present disclosure, by themselves, function as an exhaust gas purifying catalyst. In some embodiments, the fine composite metal particles obtained by the present disclosure are carried on a powder carrier, which is optionally comprised in the exhaust gas purifying catalyst of the present disclosure.

The type of the powder carrier, on which the fine composite metal particles are carried, is not limited. The power carrier may be any given metal oxide, which is generally used as a powder carrier in the technical field of exhaust gas purifying catalysts.

Examples of such a powder carrier include silica ($SiO_2$), magnesium oxide (MgO), zirconia ($ZrO_2$), ceria ($CeO_2$), alumina ($Al_2O_3$), titania ($TiO_2$), a solid solution thereof, and a combination thereof.

An acidic carrier, such as $SiO_2$, has high compatibility with a catalytic metal that reduces NOx. A basic carrier, such as MgO, has high compatibility with K or Ba that stores NOx. $ZrO_2$ suppresses the sintering of other powder carriers under high-temperature conditions, in which such other powder carriers are sintered, and $ZrO_2$, which is combined with Rh as a catalytic metal, causes a steam reforming reaction to generate $H_2$, so that the reduction of NOx can be efficiently carried out. $CeO_2$ has OSC (Oxygen Storage Capacity) properties, by which $CeO_2$ stores oxygen in a lean atmosphere, whereas $CeO_2$ releases oxygen in a rich atmosphere, and therefore, $CeO_2$ can be used in a three way catalyst and the like. Since an acidic-basic amphoteric carrier, such as $Al_2O_3$, has a high specific surface area, the acidic-basic amphoteric carrier can be used to efficiently carry out storage and reduction of NOx. $TiO_2$ can exhibit the effect of suppressing the sulfur poisoning of a catalytic metal.

It should be understood that, according to the properties of the above-described powder carriers, the exhaust gas-purifying ability of the exhaust gas purifying catalyst of the present disclosure, and in some embodiments, the NOx-purifying ability thereof can be improved, depending on the type, composition, combination and ratio thereof, and/or amount of the selected powder carriers.

When the fine composite metal particles are carried on this powder carrier, the contact surface between the exhaust gas and the fine composite metal particles can be increased since the powder carrier has a large specific surface area. Thereby, the performance of the exhaust gas purifying catalyst can be improved.

As a method of carrying the fine composite metal particles on a powder carrier, there can be applied a method commonly used in the technical field of exhaust gas purifying catalysts.

EXAMPLES

Hereinafter, the present disclosure will be described in several examples. However, these examples are not intended to limit the scope of the present disclosure.

1. Preparation of Exhaust Gas Purifying Catalyst

In the following Comparative Examples 1 to 5 and Examples 1 to 5, the molar quantities of all catalytic metals used in each example or comparative example were set to be equal to one another. That is to say, in Comparative Examples 1 and 5 that did not contain Pd, the amount of Rh was set at 0.2% by weight. On the other hand, in Comparative Examples 2 to 4 and Examples 1 to 5, the molar quantities of Rh equimolar to the molar quantities of the added Pd was subtracted from the amount of Rh, so that the molar quantities of all metals could be set to be the equal to one another.

Comparative Example 1

(1) 31.1 mmol of PVP-K25 (manufactured by Nacalai Tesque, Inc.) was weighed into a 500-ml separable flask, in which a stirrer with a suitable size was placed, and 150 ml of 1-propanol was then added to the flask, so that PVP-K25 was dissolved therein, while stirring.

(2) A Pd chloride solution was weighed into a 100-ml beaker and an Rh chloride solution was weighed into a 100-ml beaker so that a total noble metal amount of Pd and Rh was 1.56 mmol. 5 ml of distilled water was added to each beaker, and thereafter, the solutions in each beaker were gathered, thereby preparing a starting material solution. Herein, the Pd chloride solution and the Rh chloride solution were weighed so that a molar ratio of Rh:Pd could be 100:0.

(3) The starting material solution prepared in the above (2) was added to the solution of the above (1), and the mixed solution was then stirred.

(4) The solution of the above (2) which remained in the beaker was added to the mixed solution of (3) while washing the beaker with additional 1-propanol (approximately 150 ml), followed by mixing and stirring.

(5) The above-described 500-ml separable flask was heated to reflux in an oil bath, while bubbling with $N_2$ (oil bath temperature: 102° C.). At this time, it was confirmed that the reflux took place.

(6) After 1.5 hours had passed, the obtained solution was cooled to room temperature while stirring.

(7) 80 g of $Al_2O_3$—$CeO_2$—$ZrO_2$ carrier powder ($Al_2O_3$:$CeO_2$:$ZrO_2$=30:30:40 (weight ratio)) was weighed into a 500-ml beaker.

(8) The solution of the above (6) was added to the carrier of the above (7), and the obtained mixture was then evaporated to dryness by warming the beaker containing the obtained mixture in hot water.

(9) The resultant was dried overnight in a drying furnace, was then crushed, and was then fired at 500° C. for 2 hours.

(10) The sample was removed from a firing furnace, and if the powders were still coarse, the powders were placed in a mortar and were ground with a pestle.

(11) The resulting powders were placed in a bag for use in CIP (Cold Isostatic Pressing) and were then vacuum-packed. At this time, the name of the sample was written on the CIP bag with a permanent marker.

(12) All of the samples were solidified by CIP (1 ton/cm$^2$).

(13) The solidified samples were each placed in a sieve, and were then pelletized by hitting with a pestle, thereby preparing an exhaust gas purifying catalyst.

Comparative Example 2

An exhaust gas purifying catalyst was prepared by the same procedures as those of Comparative Example 1, with the exception that the Pd chloride solution and the Rh chloride solution were weighed so that a molar ratio of Rh:Pd could be 95:5 (Rh:Pd=95:5) in (2) of Comparative Example 1.

Comparative Example 3

An exhaust gas purifying catalyst was prepared by the same procedures as those of Comparative Example 1, with the exception that the Pd chloride solution and the Rh chloride solution were weighed so that a molar ratio of Rh:Pd could be 85:15 (Rh:Pd=85:15) in (2) of Comparative Example 1.

Comparative Example 4

An exhaust gas purifying catalyst was prepared by the same procedures as those of Comparative Example 1, with the exception that the Pd chloride solution and the Rh chloride solution were weighed so that a molar ratio of Rh:Pd could be 70:30 (Rh:Pd=70:30) in (2) of Comparative Example 1.

Comparative Example 5

(1) A Pd nitrate solution and an Rh nitrate solution were each weighed into a 50-ml beaker (A) so that a total noble metal amount of Pd and Rh was 1.56 mmol. The obtained solution was then diluted with pure water to an amount of 30 ml, followed by stirring, to prepare a starting material solution. Herein, the Pd nitrate solution and the Rh nitrate solution were weighed so that a molar ratio of Rh:Pd could be 100:0.

(2) 30 ml of 20% tetramethylammonium hydroxide (TMAH) used as a neutralizer was weighed into a 50-ml beaker (B).

(3) A reactor equipped with a stirring device (super agitation reactor), which was capable of adding shearing stress caused by super agitation to the mixed aqueous solution using a stirrer that rotates at a high speed, was constructed.

(4) 150 ml of water was added to a 300-ml beaker, and the beaker was then equipped into the super agitation reactor. The water was heated to approximately 70° C. and was stirred.

(5) The starting material solution from the beaker (A) and the neutralizer from the beaker (B) were supplied, respectively, to the super agitation reactor stirring with a rotation number of 8000 rpm, so that the starting material solution was reacted with the neutralizer. The fluid supplying rate of the super agitation reactor was 5 ml/min.

(6) After completion of the fluid supply, the obtained solution was stirred with a hot stirrer at 70° C. for 30 minutes. Thereafter, the resulting solution was cooled to room temperature.

(7) 80 g of $Al_2O_3$—$CeO_2$—$ZrO_2$ carrier powder ($Al_2O_3$:$CeO_2$:$ZrO_2$=30:30:40 (weight ratio)) was weighed into a 500-ml beaker.

(8) The solution of the above (6) was added to the carrier of the above (7), and the obtained mixture was then evaporated to dryness by warming the beaker containing the obtained mixture in hot water.
(9) The resultant was dried overnight in a drying furnace, was then crushed, and was then fired at 500° C. for 2 hours.
(10) The sample was removed from a firing furnace, and if the powders were still coarse, the powders were placed in a mortar and were ground with a pestle.
(11) The resulting powders were placed in a bag for use in CIP (Cold Isostatic Pressing) and were then vacuum-packed. At this time, the name of the sample was written on the CIP bag with a permanent marker.
(12) All of the samples were solidified by CIP (1 ton/cm$^2$).
(13) The solidified samples were each placed in a sieve, and were then pelletized by hitting with a pestle, thereby preparing an exhaust gas purifying catalyst.

Example 1

An exhaust gas purifying catalyst was prepared by the same procedures as those of Comparative Example 5, with the exception that the Pd nitrate solution and the Rh nitrate solution were weighed so that a molar ratio of Rh:Pd could be 99:1 (Rh:Pd=99:1) in (1) of Comparative Example 5.

Example 2

An exhaust gas purifying catalyst was prepared by the same procedures as those of Comparative Example 5, with the exception that the Pd nitrate solution and the Rh nitrate solution were weighed so that a molar ratio of Rh:Pd could be 97:3 (Rh:Pd=97:3) in (1) of Comparative Example 5.

Example 3

An exhaust gas purifying catalyst was prepared by the same procedures as those of Comparative Example 5, with the exception that the Pd nitrate solution and the Rh nitrate solution were weighed so that a molar ratio of Rh:Pd could be 95:5 (Rh:Pd=95:5) in (1) of Comparative Example 5.

Moreover, for the purpose of increasing the number of samples, exhaust gas purifying catalysts were prepared further two times by the same procedures as those of Example 3, and the two times of examples were defined as Example 3-2 and Example 3-3, respectively.

Example 4

An exhaust gas purifying catalyst was prepared by the same procedures as those of Comparative Example 5, with the exception that the Pd nitrate solution and the Rh nitrate solution were weighed so that a molar ratio of Rh:Pd could be 90:10 (Rh:Pd=90:10) in (1) of Comparative Example 5.

Example 5

An exhaust gas purifying catalyst was prepared by the same procedures as those of Comparative Example 5, with the exception that the Pd nitrate solution and the Rh nitrate solution were weighed so that a molar ratio of Rh:Pd could be 85:15 (Rh:Pd=85:15) in (1) of Comparative Example 5.

2. Evaluation of Exhaust Gas Purifying Catalysts 2-1. Evaluation of 3 Way Activity Using 2 g of the pellet-type exhaust gas purifying catalyst, the activity was evaluated in a flow-type reaction furnace. The mixed gas shown in Table 1 was flowed at a rate of 15 L/min, and the conversion behavior of each gas was then analyzed with a multi-component analyzer. Thus, the NOx purifying rate was evaluated. The temperature-increasing rate was set at 20° C./min during the evaluation of the activity, and the temperature-increasing activity from 100° C. to 600° C. was then measured. The relationship between the time and the temperature in the evaluation of the activity is shown in FIG. 1.

[Table 1]

TABLE 1

| Amount of gas introduced under lean and rich conditions | | | | | |
|---|---|---|---|---|---|
| | | | | | Unit: % |
| | NO | $O_2$ | $CO_2$ | CO | $C_3H_6$ | $H_2O$ |
| Concentration | 0.32 | 0.5 | 14 | 0.52 | 0.1 | 3.0 |

Figure 2:
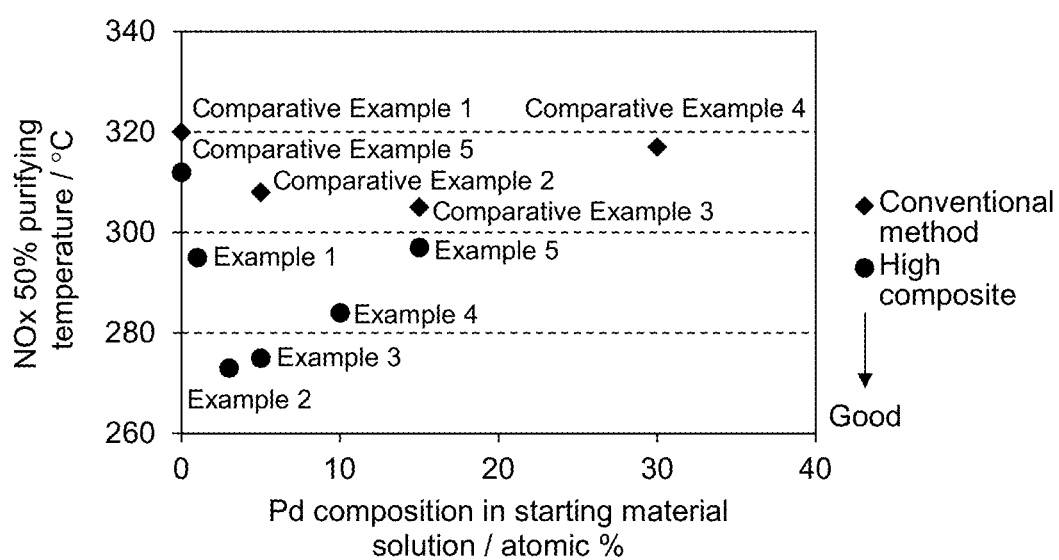
FIG. 2 shows a relationship between the Pd composition in a starting material solution and NOx 50% purifying temperature, in exhaust gas purifying catalysts of Comparative Examples 1 to 5 and Examples 1 to 5.

With regard to the results of the evaluation of the activity, the relationship between the Pd composition in a starting material solution and the NOx 50% purifying temperature in each of the exhaust gas purifying catalysts of Comparative Examples 1 to 5 and Examples 1 to 5 is shown in Table 2 and FIG. 2.

TABLE 2

List of composition and catalytic activity of Examples and Comparative Examples

| Examples/ Comparative Examples | Composition (Molar ratio) | Use of super agitation reactor | Carried amount of noble metal | NOx 50% purifying temperature/ ° C. |
|---|---|---|---|---|
| Comp. Ex. 1 | Rh100Pd0 | No | Total amount of noble metal equaled to molar amount | 320 |
| Comp. Ex. 2 | Rh95Pd5 | | | 308 |
| Comp. Ex. 3 | Rh85Pd15 | | | 305 |
| Comp. Ex. 4 | Rh70Pd30 | | | 317 |
| Comp. Ex. 5 | Rh100Pd0 | Yes | corresponding to 0.2% by weight of Rh. | 312 |
| Ex. 1 | Rh99Pd1 | | | 295 |
| Ex. 2 | Rh97Pd3 | | | 273 |
| Ex. 3 | Rh95Pd5 | | | 275 |
| Ex. 4 | Rh90Pd10 | | | 284 |
| Ex. 5 | Rh85Pd15 | | | 297 |

From Table 2 and FIG. 2, it was found that the NOx 50% purifying temperature in the Examples was lower than that in the Comparative Examples, and thus that the NOx purification performance in the Examples was improved, in comparison to that of the Comparative Examples. Moreover, the optimal Pd composition in the Examples was 2 atomic % to 5 atomic %, and the optimal Pd composition in the Examples was smaller than the optimal Pd composition in the Comparative Examples. It was considered that these results were obtained because the composite rate of Rh and Pd in the fine Rh—Pd particles in the exhaust gas purifying catalysts of the Examples was higher than that of the Comparative Examples.

2-2. Evaluation of Variation in Pd Composition

With regard to Comparative Example 2 and Example 3 in which the Pd composition in the starting material solution was 5 atomic %, standard deviation regarding a variation in the Pd composition was calculated by the following procedures.

Method of Calculating Standard Deviation Regarding Variation in Pd Composition

Twenty Fine Rh—Pd Particles Were Randomly Selected From the Exhaust Gas purifying catalyst, all of the selected fine Rh—Pd particles were then measured according to STEM-EDX, and the Pd composition in each fine Rh—Pd particle (measurement point) was then calculated. The twenty was defined as a total number of fine Rh—Pd particles, and the standard deviation was calculated from the Pd composition in each fine Rh—Pd particle.

Figure 3:
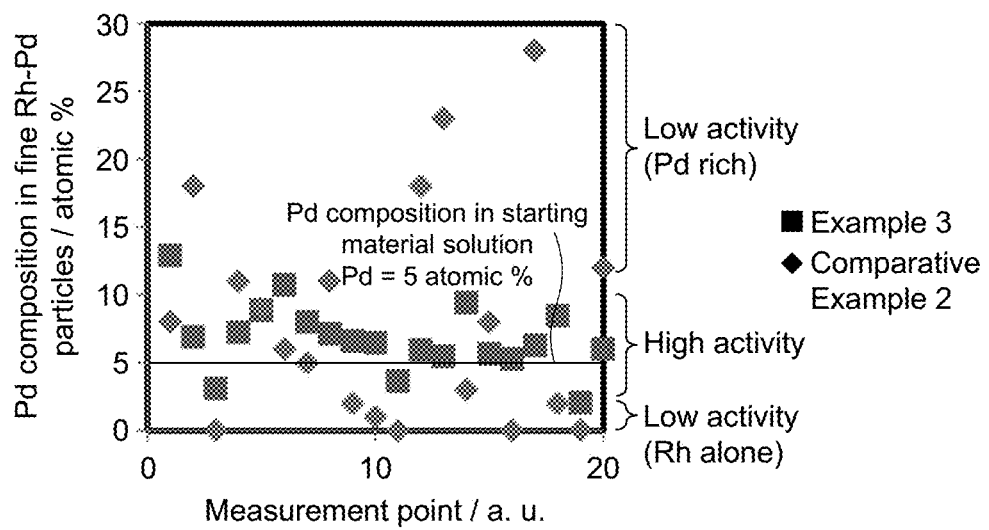
FIG. 3 shows a relationship between each measurement point of fine Rh—Pd particles and the Pd composition in the fine Rh—Pd particles, in exhaust gas purifying catalysts of Comparative Example 2 and Example 3.

FIG. 3 shows a relationship between each measurement point of fine Rh—Pd particles and the Pd composition in the fine Rh—Pd particles, in the exhaust gas purifying catalysts of Comparative Example 2 and Example 3.

As shown in FIG. 3, it was found that the Pd composition in the starting material solution was the same (5 atomic %) between the exhaust gas purifying catalyst of Comparative Example 2 and the exhaust gas purifying catalyst of Example 3, but that a variation in the Pd composition in Example 3 was smaller than a variation in the Pd composition in Comparative Example 2. The standard deviation regarding the variation in the Pd composition was 2.5 in Example 3, whereas the standard deviation regarding the variation in the Pd composition was 7.9 in Comparative Example 2.

Furthermore, with regard to the exhaust gas purifying catalysts of Example 3-2 and Example 3-3, "2-1. Evaluation of 3 way activity" and "2-2. Evaluation of variation in Pd composition" were performed in the same way as the above.

Figure 4:
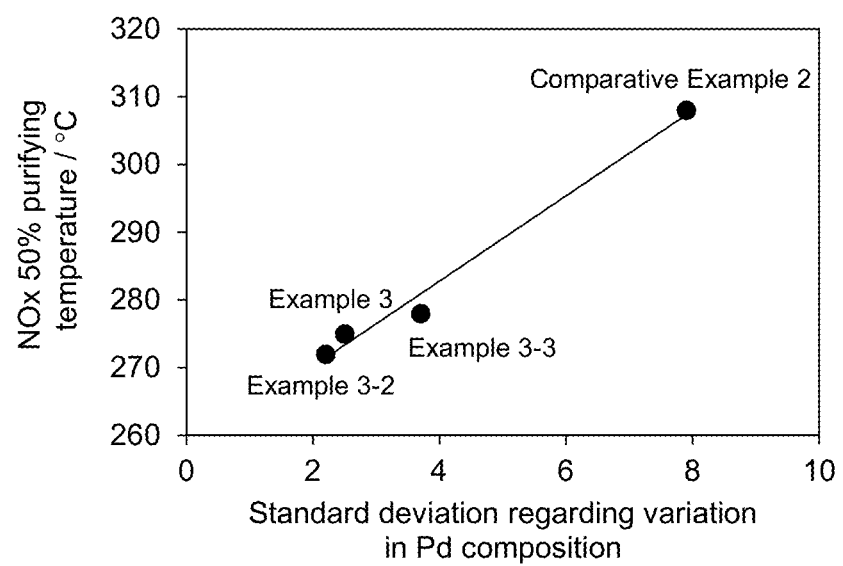
FIG. 4 shows a relationship between standard deviation regarding a variation in the Pd composition and NOx 50% purifying temperature, in exhaust gas purifying catalysts of Comparative Example 2, Example 3, Example 3-2, and Example 3-3.

FIG. 4 shows a relationship between standard deviation regarding a variation in the Pd composition and NOx 50% purifying temperature, in the exhaust gas purifying catalysts of Comparative Example 2, Example 3, Example 3-2, and Example 3-3.

As shown in FIG. 4, if the standard deviation regarding the variation in the Pd composition was less than 5, a difference in the catalytic activity clearly appeared, with respect to Comparative Example 2.

Figure 5:
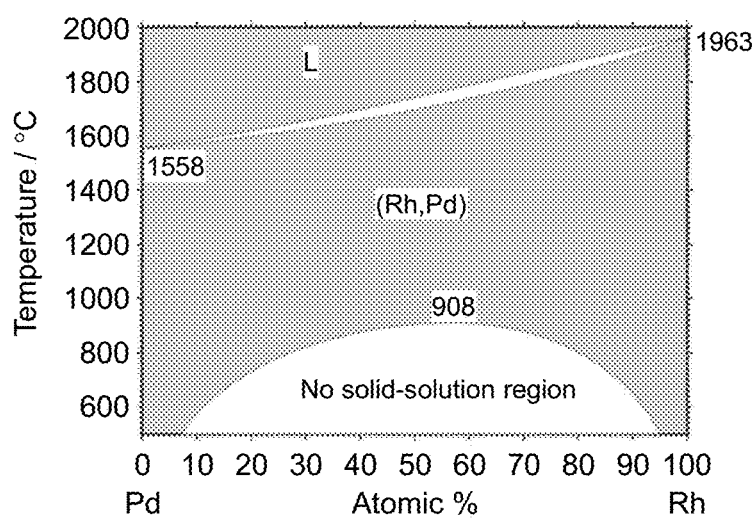
FIG. 5 shows a binary phase diagram of an Rh—Pd system.
Figure 6:
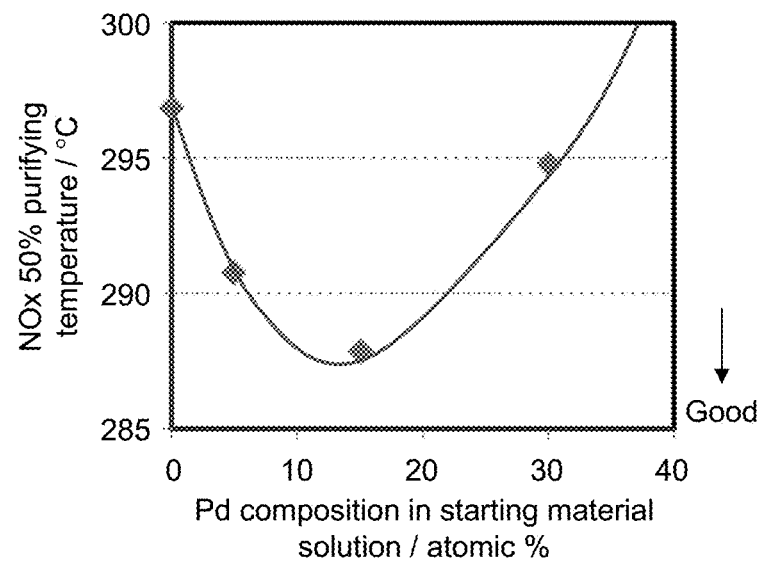
FIG. 6 shows a relationship between the Pd composition in a starting material solution and NOx 50% purifying temperature, in exhaust gas purifying catalysts (Comparative Examples 1 to 4) obtained by a tracing experiment.
Figure 7:
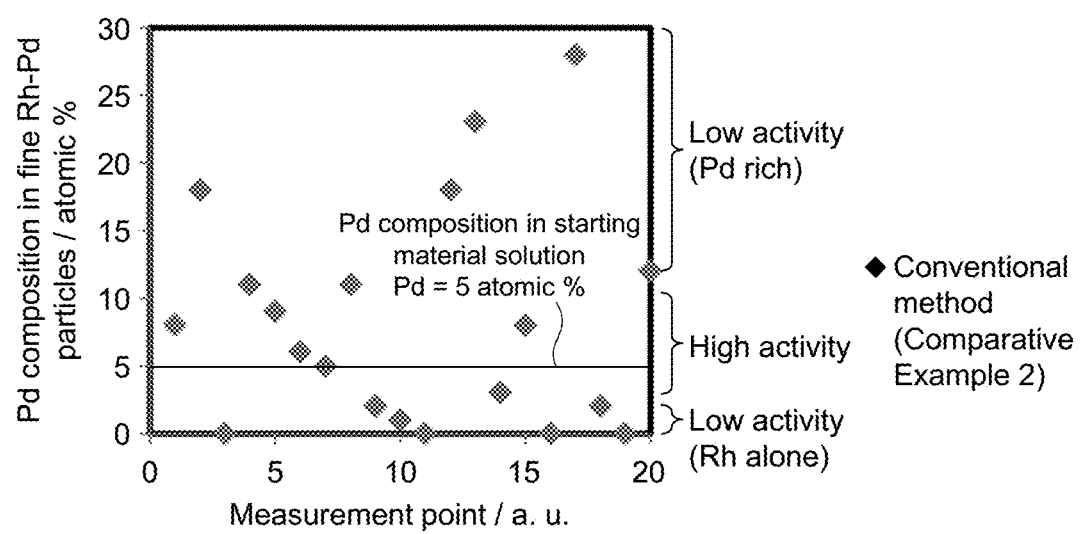
FIG. 7 shows a relationship between each measurement point of fine Rh—Pd particles and the Pd composition in the fine Rh—Pd particles, in an exhaust gas purifying catalyst (Comparative Example 2) obtained by a tracing experiment.
Figure 8:
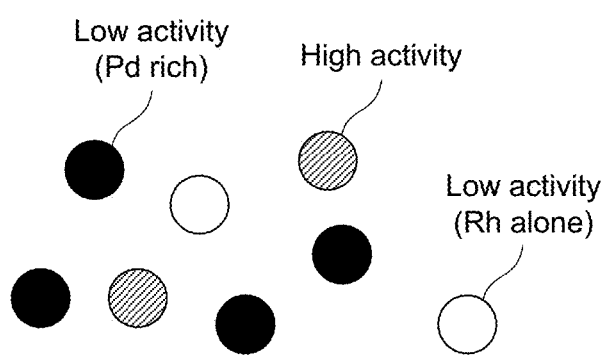
FIG. 8 shows a schematic view of fine Rh—Pd particles in an exhaust gas purifying catalyst obtained by a tracing experiment.

Considering from a binary phase diagram of an Rh—Pd system (FIG. 5), the region that easily forms a solid solution (composite) is a region containing less than 5 atomic % of Pd, and it was considered that fine Rh—Pd particles having a shaper Pd composition could be prepared in this range. As a result, it was considered that the exhaust gas purifying catalysts of the Examples exhibited higher NOx purification performance than the exhaust gas purifying catalysts of the Comparative Examples.

All publications, patents and patent applications cited in the present description are herein incorporated by reference as they are.

What is claimed is:

1. A method for producing an exhaust gas purifying catalyst having fine composite metal particles containing Rh and Pd, comprising:
    preparing a starting material solution containing a homogenous mixture of Rh and Pd, in which an atomic percentage of Pd to a total of Rh and Pd (=(number of Pd atoms/(total number of Rh and Pd atoms))×100) is 1 atomic % to 15 atomic %;
    allowing the prepared starting material solution to react with a neutralizer by a super agitation reactor having a rotation number of 1,000 rpm to 40,000 rpm, to generate fine composite metal particles in which Rh and Pd are homogeneously dispersed; and
    mixing the fine composite metal particles with a powder carrier to obtain the exhaust gas purifying catalyst.

2. The method according to claim 1, wherein the atomic percentage of Pd to the total of Rh and Pd is 2 atomic % to 5 atomic %.

3. The method according to claim 1, wherein the rotation number of the super agitation reactor is 5,000 rpm to 10,000 rpm.

4. The method according to claim 2, wherein the rotation number of the super agitation reactor is 7,000 rpm to 9,000 rpm.

5. The method according to claim 1, wherein the neutralizer is an organic base.

6. The method according to claim 2, wherein the neutralizer is an organic base.

7. The method according to claim 3, wherein the neutralizer is an organic base.

8. The method according to claim 1, wherein the starting material solution is a mixed solution of an Rh nitrate solution and a Pd nitrate solution, and the neutralizer is tetramethylammonium hydroxide.

9. The method according to claim 2, wherein the starting material solution is a mixed solution of an Rh nitrate solution and a Pd nitrate solution, and the neutralizer is tetramethylammonium hydroxide.

10. The method according to claim 3, wherein the starting material solution is a mixed solution of an Rh nitrate solution and a Pd nitrate solution, and the neutralizer is tetramethylammonium hydroxide.

11. The method according to claim 4, wherein the starting material solution is a mixed solution of an Rh nitrate solution and a Pd nitrate solution, and the neutralizer is tetramethylammonium hydroxide.

12. The method according to claim 1, wherein
    when the fine composite metal particles containing Rh and Pd in the exhaust gas purifying catalyst are analyzed according to STEM-EDX, an average of an atomic percentage of Pd to a total of Rh and Pd is 2 atomic % to 5 atomic % (wherein the average of the atomic percentage of Pd to the total of Rh and Pd is a value calculated by randomly selecting 10 or more fine composite metal particles containing Rh and Pd from the exhaust gas purifying catalyst, measuring all of the selected fine composite metal particles containing Rh and Pd according to STEM-EDX, totalizing all values of the atomic percentage of Pd to the total of Rh and Pd in each fine composite metal particle containing Rh and Pd, and dividing the obtained sum by a total number of all of the selected fine composite metal particles containing Rh and Pd), and
    a standard deviation regarding a variation in the atomic percentage of Pd to the total of Rh and Pd is less than 5 (wherein the standard deviation regarding the variation in the atomic percentage of Pd to the total of Rh and Pd is calculated by randomly selecting 20 or more fine composite metal particles containing Rh and Pd from the exhaust gas purifying catalyst, measuring all of the selected fine composite metal particles containing Rh and Pd according to STEM-EDX, calculating the atomic percentage of Pd to the total of Rh and Pd in each fine composite metal particle containing Rh and Pd, defining the number of all of the selected fine composite metal particles containing Rh and Pd as a total number, and calculating based on the atomic percentage of Pd to the total of Rh and Pd in each fine composite metal particle containing Rh and Pd).

13. The method according to claim 1, wherein the powder carrier comprises one or more selected from the group consisting of silica ($SiO_2$), magnesium oxide (MgO), zirconia ($ZrO_2$), ceria ($CeO_2$), alumina ($Al_2O_3$), and titania ($TiO_2$), or a solid solution thereof.

14. The method according to claim 1, wherein a concentration of Rh ions in the starting material solution is 0.01 mol/L (M) to 1 M, and a concentration of Pd ions in the starting material solution is 0.1 mM to 50 mM.

15. The method according to claim 1, wherein a concentration of Rh ions in the starting material solution is 0.03 mol/L (M) to 0.5 M, and a concentration of Pd ions in the starting material solution is 0.5 mM to 25 mM.

* * * * *